Aug. 19, 1958  G. M. STOCKWELL  2,848,677
SHAFT POSITIONING CONTROL MECHANISM
Filed July 19, 1956  2 Sheets-Sheet 1

INVENTOR.
GLADE M. STOCKWELL
BY
Moody & Habucken
ATTORNEYS

Aug. 19, 1958 G. M. STOCKWELL 2,848,677
SHAFT POSITIONING CONTROL MECHANISM
Filed July 19, 1956 2 Sheets-Sheet 2

INVENTOR.
GLADE M. STOCKWELL
BY
Moody & Hatcher
ATTORNEYS

United States Patent Office 2,848,677
Patented Aug. 19, 1958

2,848,677

SHAFT POSITIONING CONTROL MECHANISM

Glade M. Stockwell, Cedar Rapids, Iowa, assignor to Collins Radio Company, Cedar Rapids, Iowa, a corporation of Iowa Application July 19, 1956, Serial No. 598,929

10 Claims. (Cl. 318—467)

This invention relates to shaft positioning systems and more particularly to systems having a high quantity resolution capability in positioning a shaft.

Prior shaft positioning systems have involved numerous approaches. One method has been the use of a plurality of stop wheels and shafts related by gearing. This has resulted in a great complexity of detent systems, relays, gears, stop wheels. Due to the great complexity and sheer number of parts, the reliability and economy of these systems has not been satisfactory.

Accordingly, it is an object of this invention to provide a simplified multiple position shaft positioning system.

It is a further object of this invention to provide a simplified positioning system having a direct reading control box in practice of the invention.

It is a further object of this invention to provide a positioning system which develops as many well-defined positions as desired, the number of positions being expandable in a simple, economical manner.

It is a feature of this invention that a shaft is positioned to a number of positions in a revolution over a range of a plurality of revolutions of said shaft.

It is a further feature of this invention that this positioning ability may be practiced on a shaft with the same number of positions spread over such a range of turns as determined by a simple gear ratio between the positioning system and the driven unit.

It is a further feature of the invention that a control box practicing the invention is direct reading to turns and fractions of turns in determination of the shaft position.

Figure 1:
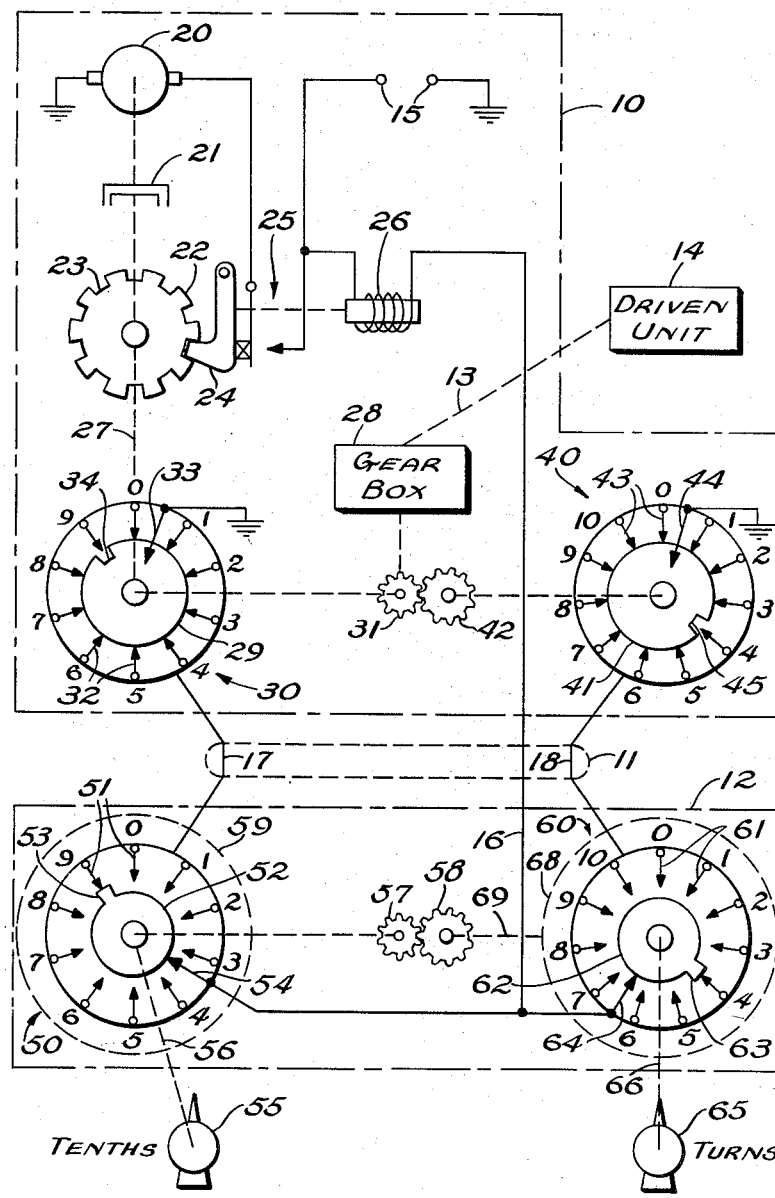
Figure 2:
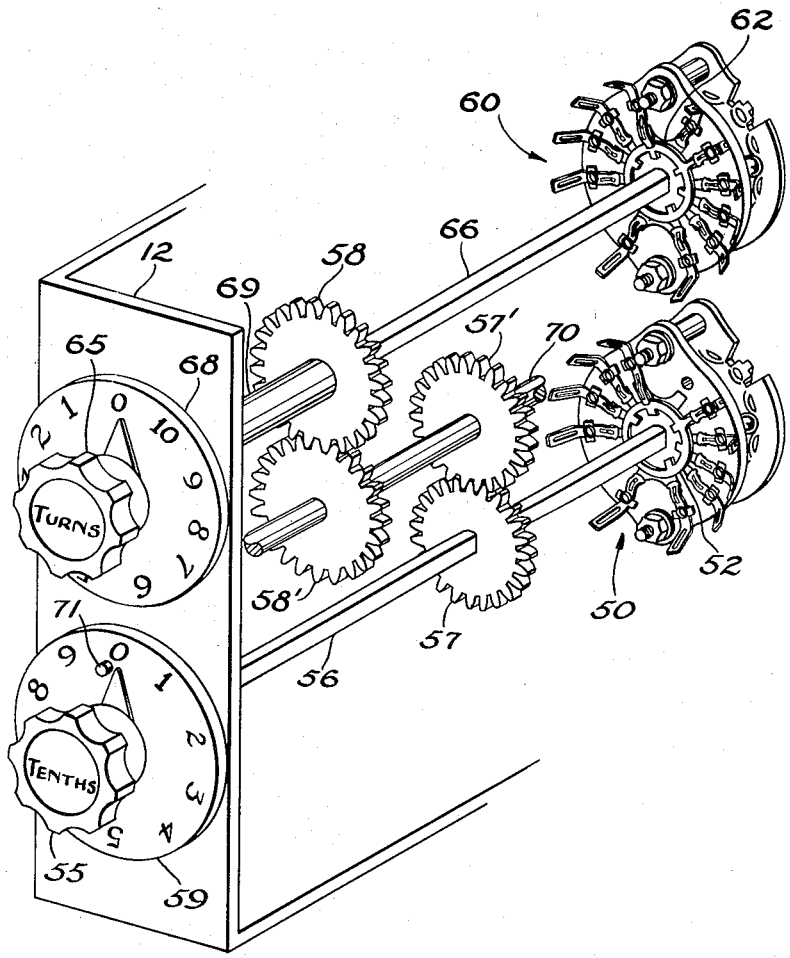

Further objects, features, and advantages of the invention will become apparent from the following description and claims when read in conjunction with the drawings, in which:

Figure 1 shows schematically the circuit diagram and over-all arrangement of the device and, Figure 2 shows the gear arrangement in a direct reading control box for Figure 1.

In Figure 1 the shaft positioning system is shown in a dashed-line box 10 coupled by an electrical cable 11 to the control switch box, also shown in a dashed-line box 12. The shaft positioning system in box 10 has as its output, shaft 13, which output is a series of positions in rotation of said shaft. A load 14 is shown on shaft 13 as illustrative of the many things which may be positioned by this system. A source of electrical energy is connected to terminals 15. This source may be of any origin, of sufficient voltage and other characteristics to operate the motor and relay contained within the positioning box 10.

Also entering box 10 is cable 11 connecting the positioning system with the control switches. Cable 11 consists of a number of wires, one of which, 16, is a common. The remainder of the wires are connected between the seeking switches in box 10 and like positions on corresponding switches in the control box. This plurality of wires between the two switches is illustrated schematically as 17 and 18.

In positioning box 10 a motor 20 originates rotary power for the positioning operation. A torque limiting clutch 21 is attached to the motor shaft and couples the motor to stop wheel 22. Stop wheel 22 has a series of notches 23 which are spaced about the periphery. In this case, since tenths of rotations are to be positioned, stop wheel 22 has ten equally spaced notches. Engaging notches 23 is a pawl 24. Mounted on pawl 24 is a switch 25 which is inserted in the power circuit of motor 20. Actuating pawl 24 is a solenoid 26. Energization of solenoid 26 pulls pawl 24 out of one of the notches 23 and simultaneously closes switch 25 to energize motor 20.

Stop wheel 22 is mounted on a common shaft 27 which connects the output of the torque limiting clutch to gear box 28. Shaft 27 carries the rotor 29 of switch 30, and gear 31. Gear box 28 couples shaft 27 to the output shaft 13. In the form of the invention illustrated gear box 28 has a one-to-one ratio. Where it is desired that driven unit 14 be positioned to the same gross number of positions over a different number of rotations of shaft 13, gear box 28 shall have that gear ratio to change the effective turns of shaft 27 to the desired number of turns of shaft 13.

Switch 30 has a plurality of contacts 32 which are equal in number with the number of notches (ten) in stop wheel 22. Rotor 29 has a wiper contact 33 which is grounded. Rotor 29 has also a notch 34 which does not ground one of the fixed contacts while the rotor grounds all others. As stated before, each fixed contact is connected by a wire in cable 17 to the corresponding fixed contact on the control switch in control box 12. Switch 30 is known in the art as a seeking switch. This is to say, the switch is rotated by the motor until the contact, shown here as the position numbered nine, is ungrounded. Since this corresponds with the circuit established by the control switch, the relay ground circuit is thus opened, the pawl drops into the related notch to stop shaft 27, and the motor is de-energized; the torque limiting clutch then slips until the motor actually stops. The switch actually seeks the contact which will stop it from moving. With ten equally spaced notches on the stop wheel 22 and ten fixed contacts, switch 30 accounts for tenths of turns of the position of shaft 27. Of course, other numbers of notches may be used with a corresponding number of fixed contacts on switch 30 for positioning other fractional parts of turns of shaft 27.

A second switch 40 is positively coupled to shaft 27. Any positive means may be used, such as chain and sprocket, other than the gear means shown. Rotor 41 is connected by gear 42 to gear 31. The tooth ratio of gear 31 to gear 42 is ten to eleven. The gear tooth ratio is directly related to the numbers of fixed contacts of switches 30 and 40, with gear 31 related to switch 30 as gear 42 is related to switch 40. Switch 40 has eleven fixed contacts 43 and a wiper 44 contacting rotor 41. Wiper 44 is grounded as is wiper 33. A notch 45 leaves ungrounded by rotor 41 one fixed contact in a seeking switch arrangement similar to that of switch 30. Each of the eleven positions is connected by wires in cable 18 to the corresponding positions on the related control switch in the control box 12.

As a consequence of the ten to eleven ratio of coupling switch 40 to shaft 27, the eleven positions of switch 40, and the number eleven being a prime number, shaft 27 may turn eleven full revolutions with a unique position of switch 40 being established for each complete revolution. Each revolution of shaft 27 sets notch 45 opposite a different fixed contact. The number of fixed contacts, and the related gear tooth ratio, must be prime or else the rotation of shaft 27 will find a sub-multiple position and thus repeat positions before the full predicted number of positions can be achieved. Exemplary of this would be using a ten to twelve tooth ratio for gears 31 and 42 and a twelve position seeking switch at 40. Here the number of positions would begin to repeat at one-half the full number of one-hundred and twenty predicted positions.

From the form of the invention illustrated it is apparent that any convenient number of fractions of a turn are directly positioned by switch 30 and the number of full revolutions of shaft 27 are registered by switch 40. Thus, a number of positions equal to the product of the number of fixed contacts on the two switches is achieved by this system.

The remotely positioned control box 12 has a control switch 50 having ten positions of fixed contacts 51, each of which, as discussed above, is connected through wires of cable 17 to the corresponding seeking switch 30. A rotor contact 52 with a projection 53 contacts only one of fixed contacts 51 in a detented position. A wiper 54 contacts rotor 53 for connection to an external circuit. Wiper 54 is connected to common line 16. A knob 55 is coupled by a shaft 56 to rotor 52 for adjustment of it to any desired position. A detent, not illustrated, is desirable for establishing a palpable position adjacent the dial indicia.

Also connected to shaft 56 is a gear 57 corresponding to gear 31. Meshing with gear 57 is a gear 58 which with 57 has the same gear ratio as gears 31 and 42. The output motion of gear 58 rotates the reference dial of switch 60. This is the correcting system for the two knobs 65 and 55 so that they are read directly in turns and tenths of turns of positioned shaft 27.

A second switch 60 is also mounted in control box 12, and is connected to its corresponding seeking switch 40 by a cable 18. Switch 60 has eleven fixed contact positions 61, a rotor 62 which through projection 63 contacts said fixed contacts selectively. Wiper 64 contacts rotor 62 for connection to external circuits. Here, as in switch 50, wiper 64 is connected to common line 16. A knob 65 is coupled to rotor 62 of switch 60 for adjustment of its position similarly to the adjustment of switch 55.

Dials 59, for switch 50, and 68, for switch 60 are shown schematically as dashed circles. The mechanical arrangement, of dial 59 being fixed and dial 68 being movable, with a coupling through gears 57 and 58 to the rotor of switch 50, is best shown in Figure 2. There it is described in detail, with elements common to the two figures numbered the same.

The circuit is readily seen as a connection from the power source to the system at terminals 15; a closed circuit through relay 26, common line 16, either or both of rotors 52 and 62 to a selected line in one or both of cables 17 and 18 to a fixed contact or contacts in seeking switches 30 and 40, to ground. If a new point is selected by either or both of switches 50 and 60, a complete circuit through the affected wiper 33 or 44 is established. This completed circuit operates relay 26, disengages the pawl from the stop wheel, and closes the motor circuit switch 25. The motor then rotates the two seeking switches until the selected line or lines are found by the notches at which instant the relay releases the pawl to engage the stop wheel for holding said position. Readjustment of a switch in the control box thus established a grounded circuit which was found and opened by the seeking switches.

While the twenty-two wires found in cable 11 are not particularly excessive, still, for some applications of this invention as illustrated or for applications when extended to greater numbers of positions a wire-saving scheme may be found desirable. One such wire-saving scheme which is readily practiced in this invention is taught by the United States Patent No. 2,476,673, issued to May et al. on July 19, 1949. The seeking and control switch construction will be altered as a consequence of application of the May et al. patent. Four wires each will serve in place of both the ten for switch 30 and up to thirteen (the highest prime under fifteen) for switch 40; the essence of the present invention will be practiced in such an arrangement nevertheless.

Figure 2 shows in perspective a gearing arrangement coupling the tenths and turns switches in control box 12 of Figure 1. In Figure 2 control box 12 carries two dials. One, 59, is associated with the tenths switch and is fixed relative to the control box. The other, 68, is rotatably mounted and driven by shaft 69. Mounted on shaft 69 is a gear 58 meshing with a second gear 58' on idler shaft 70. Shaft 69 is external and concentric to shaft 66 which turns the rotor 62 of switch 60. Knob 65 is attached to shaft 66 for positioning it in accord with the number selected on dial 68.

Knob 55 is mounted on shaft 56 for positioning this shaft in accord with the position desired relative to dial 59. Shaft 56 positions rotor 52 of switch 50. Mounted on shaft 56 is a gear 57 meshing with a second gear 57' which is fixed to idler shaft 70. Thus, rotation of shaft 56 by knob 55 rotates concentric shaft 69 through gears 57, 57', 58', and 58. This changes the reference point for the turns knob one numeral for each numeral of the tenths knob 55. In effect, a cross-feed is effected which corrects the turns dial for each position of the tenths dial. A stop pin 71 is necessary on the tenths dial to prevent more than a full revolution range thereof, thus feeding in an ambiguous reading on the turns dial. The ambiguity arises from the tenths positioning system positioning any one of ten positions in only one revolution.

The gears 57' and 58' mounted on idler shaft 70 have, respectively, the ten to eleven tooth ratio as do the corresponding gears of Figure 1. Thus, a full clockwise revolution of knob 55 turns dial 68 ten-elevenths of a rotation in a clockwise sense. For each position of the tenths knob in the zero turns revolution, the turns knob is readjusted a position; thus for one full sweep of the tenths knob, the turns knob is kept at "zero," with the dial ultimately coming to rest with the numeral one under the pointer of the turns knob. This makes setting the positioning system in revolutions and tenths thereof direct reading, rendering unnecessary code books or other ways of transforming switch information into a desired position.

The shaft positioning box 10 will work equally well without the gear coupling between the tenths shaft and the turns dial in the control box but in this case a code book would be necessary to translate the dial positions into desired shaft positions or vice-versa.

For higher quantity resolution of the shaft position, a third switch having any prime number of positions, such as thirteen, is coupled to shaft 27 in Figure 1 by a gear having the same tooth ratio as the prime number, e. g., a thirteen tooth gear is meshed with a ten tooth gear on shaft 27. The ten tooth gear arises as a result of switch 30 having ten positions. Another group of wires would be carried from the positioning box 10 to the control box 12, with selection of a wire thereamong by a control system similar to the tenths illustrated in the control box. Since a prime number is used, the third switch uniquely positions thirteen times (for the prime number thirteen) each group of one-hundred and ten positions of the first two switches. Thus, for a thirteen position third switch, a three switch system positions ten times eleven times thirteen equalling 1430 positions. This, of course, will be in one-hundred and forty-three turns of shaft 27. If one revolution is desired, with 1430 positions thereof, gear box 28 then needs a gear-down of one-hundred and forty-three to one. The gear-corrected control box may be similarly constructed, or a non-coupled switch array may be used for code book selection of the proper number for a desired shaft position, with fixed dials on the control box switches. In extending the two-switch control box one could gear a third dial by a thirteen to ten ratio to shaft 66, and put in a stop between ten and zero on dial 68, to avoid ambiguity in the next dial.

Although this invention has been described with respect to particular embodiments thereof, it is not to be so limited because changes and modifications may be made therein which are within the full intended scope of the invention as defined by the appended claims.

I claim:

1. A shaft positioning system comprising a source of rotational energy, stop means having a first number of positions, a shaft, said stop means determining the orientations of said shaft during one revolution, a plurality of seeking switches coupled to said shaft, one of said plurality of seeking switches being coupled directly to said shaft and having said first number of positions, the remainder of said plurality of seeking switches each being positively coupled to said shaft by a ratio of said first number to a prime number, and each of the remainder of said plurality of seeking switches having a number of positions equal to the prime number used in its coupling ratio.

2. A shaft positioning system comprising a source of rotational power, stop means having a desired number of positions in a revolution, a shaft, a plurality of seeking switches, a load which is to be positioned, said shaft coupling said source to said load and directly to one of said seeking switches, said one of said plurality of seeking switches having a number of positions equal to said desired number, positive coupling means connecting another of said plurality of seeking switches to said shaft with a ratio of said desired number to a prime number, and said other seeking switch having a prime number of positions, said prime number being equal to the prime number in the respective coupling ratio.

3. A shaft positioning system comprising a shaft, a plurality of seeking switches, one of said plurality of switches having direct coupling to said shaft and having a number of positions equal to desired parts of revolution of said shaft, the remainder of said plurality each having coupling means to said shaft, each of said coupling means having the ratio of said number of positions to a prime number, and each of the remainder of said plurality of seeking switches having a number of positions equal to the prime number in the ratio coupling said switch to said shaft.

4. A shaft positioning system comprising a shaft, a source of rotary power, a load, a plurality of seeking switches, said shaft coupling said power source to both said load and said plurality of switches, one of said plurality of switches being coupled directly to said load and having a desired number of positions, stop means coupled to said load and having said desired number of stop positions, the remainder of said plurality of switches each being positively coupled to said load by means having a ratio of said desired number to a prime number, the number of positions of each of said remainder of switches being equal to the prime number in its coupling to said load, a plurality of control switches, each of said plurality of control switches having a number of positions equal to that number of a corresponding seeking switch, electrical means connecting each of said plurality of seeking switches with each of said plurality of corresponding control switches for actuating said stop means, whereby said shaft is positioned by said stop means in any one of a number of positions equal to the product of the positions of each of said seeking switches.

5. The shaft positioning system of claim 4 wherein said control switches each have dials with indicia related to the positions of said switch, the dial of one switch being positively coupled to the shaft of another switch by a ratio equal to the ratio used between the seeking switches corresponding to said conrtol switches, said other switch shaft having thereon means preventing more than one revolution thereof.

6. A shaft positioning control system comprising a shaft to be positioned, a plurality of seeking switches, one of said plurality being directly coupled to said shaft and having a predetermined number of positions, each of the remainder of said plurality of seeking switches being coupled by positive means to said shaft by a ratio of said predetermined number to a prime number, each of said remainder of said plurality of seeking switches having a number of positions equal to the prime number used in its coupling, a plurality of control switches, each corresponding with a seeking switch, one of said plurality of control switches having said predetermined number of positions, and each of the remainder of said plurality of control switches having a number of positions equal to the prime number of positions in its corresponding seeking switch.

7. A shaft positioning control system comprising a shaft to be positioned, a plurality of seeking switches, one of said plurality of seeking switches being directly coupled to said shaft, said one of said seeking switches having a desired number of positions, the remainder of said plurality of seeking switches each being positively coupled to said shaft by means having a ratio of said desired number to a prime number, the number of positions of each of said remainder of seeking switches being a prime number equal to that in its coupling ratio, a plurality of control switches equal in number to the number of seeking switches, each of said control switches having positions equal to its corresponding seeking switch, and electrical means connecting corresponding seeking and control switches.

8. The control system of claim 7 comprising switch shafts for setting said control switches, dials adjacent said switch shaft, pointers on said switch shafts for cooperation with said dials, positive coupling means between the shaft of the control switch corresponding to said one seeking switch and the dial of another of said control switches whereby the dial of said other switch is correctly positioned under the pointer of said other switch.

9. A shaft positioning control system comprising a shaft to be positioned, a plurality of seeking switches, one of said plurality of seeking switches being directly coupled to said shaft, said one of said seeking switches having a desired number of positions, the remainder of said plurality of seeking switches each being positively coupled to said shaft by means having a ratio of said desired number to a prime number, the number of positions of each of said remainder of seeking switches being a prime number equal to that in its coupling ratio, a plurality of control switches equal in number to the number of seeking switches, each of said control switches having positions equal to its corresponding seeking switch, electrical means connecting corresponding seeking and control switches, a plurality of dials and pointers associated with said control switches, the dial for said desired number position control switch being fixed, the dial next related to said fixed dial being driven by positive coupling means from said desired number position control switch with a coupling ratio equal to that ratio between the corresponding seeking switches, and a stop on said fixed dial to prevent more than one rotation of the shaft cooperating therewith.

10. A shaft positioning system comprising a plurality of control switches, one of said plurality of control switches having a desired number of positions, the remainder of said plurality of control switches each having a prime number of positions, a shaft, pointer and dial for each of said plurality of switches, said one switch having its dial fixed, one of said remainder of control switches having its dial positively coupled to the shaft of said one switch with a ratio of said desired number to the prime number of said other switch, stop means for said one switch shaft for preventing over one revolution thereof, whereby said other switch dial is correctly positioned under its pointer.

References Cited in the file of this patent
UNITED STATES PATENTS 2,698,409    Sherwood _____ Dec. 28, 1954
2,760,138    Colby _____ Aug. 21, 1956